United States Patent [19]
Broderick et al.

[11] Patent Number: 5,993,532
[45] Date of Patent: Nov. 30, 1999

[54] STABILIZATION OF HYDROGEN SILSEQUIOXANE RESIN SOLUTIONS

[75] Inventors: Dennis William Broderick, Rhodes; James Anthony Helwick, Midland, both of Mich.; Takashi Nakamura, Ichihara, Japan

[73] Assignees: Dow Corning Corporation, Midland, Mich.; Dow Corning Toray Silicone Co., Ltd., Tokyo, Japan

[21] Appl. No.: 08/979,223

[22] Filed: Nov. 26, 1997

Related U.S. Application Data

[63] Continuation of application No. 08/034,435, Mar. 19, 1993, abandoned.

[51] Int. Cl.$^6$ ........................................................ C08J 3/20
[52] U.S. Cl. .................... 106/287.12; 423/274; 423/325; 524/320; 524/321; 524/286; 524/296; 524/249; 524/295; 524/158; 524/429; 524/405; 524/417; 524/414
[58] Field of Search ....................... 106/287.12; 423/274, 423/325; 524/320, 321, 286, 296, 249, 295, 158, 429, 405, 417, 414

[56] References Cited

U.S. PATENT DOCUMENTS

| | | | |
|---|---|---|---|
| 3,811,918 | 5/1974 | Levene | 117/47 |
| 3,986,997 | 10/1976 | Clark | 260/29.2 M |
| 4,842,901 | 6/1989 | Merrem et al. | 427/387 |
| 4,847,162 | 7/1989 | Haluska et al. | 428/457 |
| 4,999,397 | 3/1991 | Weiss et al. | 524/755 |
| 5,063,267 | 11/1991 | Hanneman et al. | 524/284 |

FOREIGN PATENT DOCUMENTS

| | | |
|---|---|---|
| 0443760 | of 0000 | European Pat. Off. . |
| 0516144 | of 0000 | European Pat. Off. . |
| 163277 | 6/1989 | Japan . |

*Primary Examiner*—Margaret G. Moore
*Attorney, Agent, or Firm*—Sharon K. Severance; Roger E. Gobrogge

[57] ABSTRACT

A stabilized solution of hydrogen silsesquioxane resin is disclosed. The solution comprises 100 parts by weight solvent, 0.1 to 100 parts by weight hydrogen silsesquioxane resin, and 0.002 to 4 parts by weight acid. These solutions are useful for forming coatings on substrates.

15 Claims, No Drawings

1

STABILIZATION OF HYDROGEN SILSEQUIOXANE RESIN SOLUTIONS

This application is a continuation of application Ser. No. 08/034,435 filed Mar. 19, 1993 which application is now: abandoned

BACKGROUND OF THE INVENTION

The present invention relates to solutions of hydrogen silsesquioxane resin which are stable when stored for extended periods of time. These stable solutions are obtained by incorporating small amounts of acids in the solution.

Hydrogen silsesquioxane resin is known in the art to be useful as a precursor to silica-containing ceramic coatings. For instance, U.S. Pat. No. 4,756,977 granted to Haluska et al. describes a process for forming such a coating in which hydrogen silsesquioxane is diluted in a solvent, applied to a substrate and ceramified by heating.

Various methods for producing hydrogen silsesquioxane resin are also known in the art. For example, U.S. Pat. No. 3,615,272 describes a process for preparing this material which comprises adding trichlorosilane to a reaction medium comprising sulfuric acid and an aromatic hydrocarbon, washing the reaction mixture until neutral and recovering the condensed resin. Despite the fact that the reference teaches hydrolysis and condensation in an acid, the resultant product is neutralized to prevent gelation.

U.S. Pat. No. 5,010,159 teaches a similar process in which a hydridosilane is reacted in an arylsulfonic acid hydrolysis medium followed by separating the resultant resin and then contacting it with a neutralizing agent. Again, however, the resultant resin is neutralized to prevent gelation.

The shelf life of the above hydrogen silsesquioxane resin diluted in a solvent may, however, be variable due to the resin crosslinking and, thus, increasing in molecular weight. The present inventors have now discovered that the incorporation of an acid in the hydrogen silsesquioxane resin solution limits the changes in the molecular weight of the resin.

SUMMARY OF THE INVENTION

The present invention relates to a stabilized solution of hydrogen silsesquioxane resin. The solution comprises 100 parts by weight solvent, 0.1 to 100 parts by weight hydrogen silsesquioxane resin, and 0.002 to 4 parts by weight acid.

DETAILED DESCRIPTION OF THE INVENTION

The present invention is based on the discovery that solutions of hydrogen silsesquioxane can be stabilized by the addition of small amounts of acids. This was particularly unexpected since the prior art teaches neutralization of such solutions to prevent gelation.

As used in the present disclosure, the expressions "stable" or "stabilized" resin solutions are used to describe those solutions in which the molecular weight of the resin changes less over time than those which have not been stabilized. It is preferred that the "stable" solutions not gel. It is more preferred that the Mw of the "stable" solutions not change more than about 100%. It is most preferred that the Mw of the "stable" solutions not change more than about 25%.

The hydrogen silsesquioxane resins (H-resin) which may be used in this invention include hydridosiloxane resins of the formula $HSi(OH)_x(OR)_yO_{z/2}$, in which each R is independently an organic group or a substituted organic group which, when bonded to silicon through the oxygen atom, forms a hydrolyzable substituent, $x=0-2$, $y=0-2$, $z=1-3$, $x+y+z=3$. Examples of R include alkyls such as methyl, ethyl, propyl, butyl, etc., aryls such as phenyl, and alkenyls such as allyl or vinyl. As such, these resins may be fully condensed $(HSiO_{3/2})_n$ or they may be only partially hydrolyzed (i.e., containing some Si-OR) and/or partially condensed (i.e., containing some Si-OH). Although not represented by this structure, these resins may also contain a small number (eg, less than about 10%) of silicon atoms which have either 0 or 2 hydrogen atoms attached thereto due to various factors involved in their formation or handling.

The above H-resins and methods for their production are known in the art. For example, Collins et al. in U.S. Pat. No. 3,615,272, which is incorporated herein by reference, teach the production of a nearly fully condensed H-resin (which may contain up to 100–300 ppm silanol) by a process comprising hydrolyzing trichlorosilane in a benzenesulfonic acid hydrate hydrolysis medium and then washing the resultant resin with water and/or aqueous sulfuric acid. Similarly, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is separated, washed and contacted with a neutralizing agent.

Other hydridosiloxane resins, such as those described by Frye et al. in U.S. Pat. No. 4,999,397, hereby incorporated by reference, those produced by hydrolyzing an alkoxy or acyloxy silane in an acidic, alcoholic hydrolysis medium, those described in Kokai Patent Nos. 59-178749, 60-86017 and 63-107122, or any other equivalent hydridosiloxane, will also function herein.

It is to be noted that in a preferred embodiment of the invention, specific molecular weight fractions of the above H-resins may also be used in this process. Such fraction and methods for their preparation are taught, for example, by Hanneman et al. in U.S. Pat. No. 5,063,267 which is hereby incorporated by reference. Alternative approaches, however, are also contemplated. For example, fractions can also be obtained by a non-solvent precipitation process wherein the hydrogen silsesquioxane is dissolved in a non-polar solvent such as toluene followed by adding a polar solvent such as acetonitrile thereto to precipitate a fraction of the resin. Since this precipitation process progressively precipitates lower molecular weight fractions with higher concentrations of the polar solvent, the process often involves first precipitating and removing the undesired higher molecular weight fractions from the solution followed by precipitating and collecting the desired fraction and leaving the undesired low molecular weight fractions in solution. A preferred fraction comprises material wherein at least 75% of the polymeric species have a molecular weight above about 1200 and a more preferred fraction comprises material wherein at least 75% of the polymeric species have a molecular weight between about 1200 and about 50,000 (relative to polydimethylsiloxane standards).

According to the present invention, the H-resin is merely dissolved in a solvent to form a solution. Various facilitating measures such as stirring and/or heating may be used as necessary. Solvents which may be used include any agent or mixture of agents which will dissolve the H-resin to form a homogenous liquid mixture. These solvents can include, for example, alcohols such as ethyl or isopropyl, aromatic hydrocarbons such as benzene or toluene, alkanes such as n-heptane or dodecane, ketones such as methylisobutylketone, esters, glycol ethers, or cyclic dimethylpolysiloxanes. Particularly preferred herein is methylisobutylketone.

The above solvents are used in an amount sufficient to dissolve the H-resin to the concentration desired for application. Generally, enough of the above solvent is used to form a 0.1–50 wt. percent solids solution (i.e., 100 parts by weight solvent and 0.1 to 100 parts by weight H-resin).

As noted above, these H-resin solutions may be unstable and undergo molecular weight shifts which may not be desirable (eg., the material may deposit a thicker coating, the material may gel, etc.). This instability is dependent on factors such as water, impurities, atmospheric humidity, fractionation and temperature. For example, fractionated material is stable for about 3–4 months under refrigeration (eg., 0° C.) whereas it is only stable for about 1–5 months at room temperature.

According to the present invention, it has been discovered that the addition of a small amount of acid to these solutions can dramatically affect their stability. Although not wishing to be bound by theory, Applicants postulate that both the acidity and the chemical reactions (eg., oxidation, chemical complexing, etc.) of the acids contribute to their effects.

The acids which can be used herein are any which have the desired stabilizing effect without adversely affecting the resin. These can include, for example, inorganic acids such as boric, carbonic, hydrochloric, iodic, nitric, nitrous, phosphoric, phosphorous, sulfuric and sulfurous as well as organic acids such as acetic, benzoic, butyric, citric, formic, lactic, maleic, naphthoic, oxalic, phthalic, picric, propionic, succinic, tartaric, toluic, toluene sulfonic and trifluoroacetic. Of these, nitric acid is particularly preferred.

The above acids are added to the solution in an amount effective to stabilize the H-resin. This amount can vary over a wide range depending on the acid. Generally, however, the acids are added in an amount of between about 0.002 and about 4 parts per weight, and, preferably, between about 0.01 and 0.1 parts per weight, based on the total weight of solution.

It should be noted that the order of mixing the acid, solvent and resin is not critical. For example, in addition to the order described above. the H-resin may be simply dissolved in a solvent-acid mixture.

In addition to the above ingredients, the solution of the present invention may also contain other ingredients. These include, for example, ceramic oxide precursors. Examples of such ceramic oxide precursors include compounds of various metals such as aluminum, titanium, zirconium, tantalum, niobium and/or vanadium as well as various non-metallic compounds such as those of boron or phosphorous which may be dissolved in solution, hydrolyzed, and subsequently pyrolyzed, at relatively low temperatures and relatively rapid reaction rates to form ceramic oxide coatings.

The above ceramic oxide precursor compounds generally have one or more hydrolyzable groups bonded to the above metal or non-metal, depending on the valence of the metal. The number of hydrolyzable groups to be included in these compounds is not critical as long as the compound is soluble in the solvent. Likewise, selection of the exact hydrolyzable substituent is not critical since the substituents are either hydrolyzed or pyrolyzed out of the system. Typical hydrolyzable groups include, but are not limited to, alkoxy, such as methoxy, propoxy, butoxy and hexoxy, acyloxy, such as acetoxy, or other organic groups bonded to said metal or non-metal through an oxygen such as acetylacetonate. Specific compounds, therefore, include zirconium tetracetylacetonate, titanium dibutoxy diacetylacetonate, aluminum triacetylacetonate and tetraisobutoxy titanium When the hydrogen silsesquioxane resin solution is to be combined with one of the above ceramic oxide precursors, generally it is used in an amount such that the final ceramic coating contains 0.1 to about 30 percent by weight modifying ceramic oxide.

The solution may also contain a platinum, rhodium or copper catalyst to increase the rate and extent of conversion to silica. Generally, any platinum, rhodium or copper compound or complex which can be solubilized will be functional. For instance, a composition such as platinum acetylacetonate, rhodium catalyst $RhCl_3[S(CH_2CH_2CH_2CH_3)_2]_3$, obtained from Dow Corning Corporation, Midland, Mich., or cupric naphthenate are all within the scope of this invention. These catalysts are, generally added in an amount of between about 5 to 1000 ppm, preferably 5 to 500 ppm platinum, rhodium or copper based on the weight of hydrogen silsesquioxane resin.

The resultant stabilized solutions are useful for forming coatings on various substrates, especially electronic devices.

The following non-limiting Example is provided so that those skilled in the art will more readily understand the invention.

EXAMPLE

Hydrogen silsesquioxane resin was made by the process described in U.S. Pat. No. 3,615,272. Generally, the process comprised slowly adding trichlorosilane to an agitated toluene sulfonic acid hydrate hydrolysis medium. After hydrolysis was complete, the hydrolysis medium was settled and the organic layer (containing the resin) separated and removed. The organic layer was washed twice with sulfuric acid and twice with water and then filtered and stripped to about 20 wt. % solids in toluene.

The H-resin solution was then fractionated by adding acetonitrile to the solution to precipitate out the undesired high molecular weight fractions. The desired molecular weight fraction was then precipitated out of the solution by adding additional acetonitrile.

Two samples were prepared in the above manner and their properties are listed in Table 1 at time 0 (Samples A and B).

The resultant resins were then treated with the acids and their concentrations listed in Table 1 (with a control). Gel permeation chromatography (polydimethylsiloxane standard) was run on the resins at the times listed in the Table (elapsed time) and the results recorded.

As is evident from the data, the addition of an acid to the resin solution clearly inhibits the molecular weight shifts indicative of instability.

TABLE 1

Acid Stabilization of Hydrogensilsesquioxane Solutions in Methyl Isobutyl Ketone @ 25 C.

| RESIN LOT # | ACID TYPE | ACID CONC (ppm) | PERCENT SOLIDS (%) | ELAPSED TIME (days) | Mn | Mw | Mw/Mn | Low Mw | High Mw |
|---|---|---|---|---|---|---|---|---|---|
| A | NONE | 0 | SOLID | 0 | 6416.8 | 12226.9 | 1.905 | 307 | 74846 |
|   |   |   | 20.00 | 13 | 7376.7 | 23189.0 | 3.144 | 299 | 323443 |
|   |   |   | 20.00 | 32 | 6671.4 | 44860.2 | 6.724 | 175 | 705585 |
|   |   |   | 20.00 | 46 | 8960.6 | 72313.6 | 8.070 | 222 | 1235785 |
|   |   |   | 20.00 | 60 | 9033.1 | 97690.2 | 10.815 | 258 | 1504915 |
|   |   |   | 20.00 | 73 | 9033.1 | 107622.6 | 11.914 | 258 | 1450911 |
|   |   |   | 20.00 | 95 | 8751.3 | 155841.7 | 17.808 | 256 | 1994484 |
|   |   |   | 20.00 | 110 | NOT FILTERABLE | | | | |
|   |   |   | 20.00 | 123 | 9659.0 | 187569.9 | 19.419 | 325 | 2268874 |
|   |   |   | 20.00 | 131 | 8969.7 | 181505.6 | 20.236 | 316 | 1885182 |
|   |   |   | 20.00 | 144 | 5964.2 | 170787.0 | 28.636 | 188 | 1994484 |
| A | HNO3 | 211 | SOLID | 0 | 6416.8 | 12226.9 | 1.905 | 307 | 74846 |
|   |   |   | 20.00 | 13 | 5613.8 | 13086.1 | 1.979 | 307 | 86436 |
|   |   |   | 20.00 | 32 | 5645.8 | 12784.3 | 2.264 | 179 | 94193 |
|   |   |   | 20.00 | 46 | 6045.8 | 11433.0 | 1.891 | 201 | 92251 |
|   |   |   | 20.00 | 60 | 6020.7 | 12930.6 | 2.148 | 256 | 99051 |
|   |   |   | 20.00 | 73 | 6338.6 | 13113.6 | 2.069 | 256 | 92251 |
|   |   |   | 20.00 | 95 | 5913.0 | 14056.8 | 2.377 | 256 | 108793 |
|   |   |   | 20.00 | 110 | 5523.0 | 14689.7 | 2.660 | 252 | 143114 |
|   |   |   | 20.00 | 123 | 6522.0 | 15736.8 | 2.413 | 225 | 138192 |
|   |   |   | 20.00 | 131 | 5473.7 | 15617.3 | 2.853 | 316 | 133275 |
|   |   |   | 20.00 | 144 | 4672.6 | 16518.8 | 3.535 | 196 | 157917 |
| A | HNO3 | 921 | SOLID | 0 | 6416.8 | 12226.9 | 1.905 | 307 | 74845 |
|   |   |   | 20.00 | 13 | 6672.3 | 13095.3 | 1.963 | 312 | 94193 |
|   |   |   | 20.00 | 32 | 5661.0 | 12574.1 | 2.221 | 179 | 94193 |
|   |   |   | 20.00 | 46 | 6159.0 | 12026.0 | 1.953 | 205 | 94193 |
|   |   |   | 20.00 | 60 | 5826.0 | 12318.2 | 2.114 | 256 | 86436 |
|   |   |   | 20.00 | 73 | 5511.4 | 12163.0 | 2.207 | 256 | 94241 |
|   |   |   | 20.00 | 95 | 5885.2 | 12482.7 | 2.121 | 256 | 85468 |
|   |   |   | 20.00 | 110 | 4872.6 | 12327.4 | 2.530 | 252 | 94193 |
|   |   |   | 20.00 | 123 | 5540.9 | 12610.6 | 2.276 | 225 | 103918 |
|   |   |   | 20.00 | 131 | 5021.9 | 12245.2 | 2.438 | 316 | 84501 |
|   |   |   | 20.00 | 144 | 4000.7 | 12316.2 | 3.079 | 196 | 94193 |
| A | BENZOIC | 231 | SOLID | 0 | 6416.8 | 12226.9 | 1.905 | 307 | 74846 |
|   |   |   | 20.00 | 13 | 7323.5 | 23942.1 | 3.269 | 307 | 303165 |
|   |   |   | 20.00 | 32 | 6344.0 | 44083.3 | 6.949 | 175 | 632454 |
|   |   |   | 20.00 | 46 | 8705.2 | 63564.3 | 7.302 | 209 | 1128804 |
|   |   |   | 20.00 | 60 | 9141.9 | 81204.2 | 8.883 | 256 | 1450911 |
|   |   |   | 20.00 | 73 | 7387.3 | 89158.1 | 12.069 | 256 | 1396992 |
|   |   |   | 20.00 | 95 | 8638.2 | 129935.8 | 15.042 | 256 | 1667428 |
|   |   |   | 20.00 | 110 | 8710.6 | 153372.2 | 17.608 | 248 | 1830634 |
|   |   |   | 20.00 | 123 | 10122.2 | 175250.2 | 17.313 | 325 | 2434234 |
|   |   |   | 20.00 | 131 | 8808.4 | 163357.7 | 18.546 | 320 | 1885182 |
|   |   |   | 20.00 | 144 | 6410.5 | 185282.5 | 28.903 | 196 | 2104051 |
| A | BENZOIC | 952 | SOLID | 0 | 6416.8 | 12226.9 | 1.905 | 307 | 74846 |
|   |   |   | 20.00 | 13 | 7484.9 | 30814.3 | 4.117 | 295 | 394788 |
|   |   |   | 20.00 | 32 | 7494.0 | 109574.0 | 14.622 | 175 | 1667428 |
|   |   |   | 20.00 | 46 | 10367.7 | 170529.0 | 16.448 | 188 | 2104051 |
|   |   |   | 20.00 | 60 | 9713.4 | 211496.9 | 21.774 | 252 | 2434234 |
|   |   |   | 20.00 | 73 | NOT FILTERABLE | | | | |
|   |   |   | 20.00 | 83 | SOLUTION GELLED | | | | |
| A | H3PO4 | 187 | SOLID | 0 | 6416.8 | 12226.9 | 1.905 | 307 | 74846 |
|   |   |   | 20.00 | 7 | SOLUTION GELLED | | | | |
| A | H3PO4 | 1110 | SOLID | 0 | 6416.8 | 12226.9 | 1.905 | 307 | 74846 |
|   |   |   | 20.00 | 4 | SOLUTION GELLED | | | | |
| A | F3CCOOH | 192 | SOLID | 0 | 6416.8 | 12226.9 | 1.905 | 307 | 74846 |
|   |   |   | 20.00 | 13 | 6981.0 | 14066.0 | 2.015 | 312 | 123462 |
|   |   |   | 20.00 | 32 | 6270.4 | 16629.2 | 2.652 | 196 | 152977 |
|   |   |   | 20.00 | 46 | 7191.9 | 20026.5 | 2.785 | 222 | 192645 |
|   |   |   | 20.00 | 60 | 6339.5 | 15387.5 | 2.427 | 260 | 143114 |
|   |   |   | 20.00 | 73 | 6795.5 | 32924.7 | 4.845 | 256 | 384563 |
|   |   |   | 20.00 | 95 | 7606.8 | 56495.3 | 7.427 | 256 | 916157 |
|   |   |   | 20.00 | 110 | 8063.8 | 81030.3 | 10.049 | 248 | 1236785 |
|   |   |   | 20.00 | 123 | 9214.4 | 103236.6 | 11.204 | 329 | 1450911 |
|   |   |   | 20.00 | 131 | 9713.4 | 121992.2 | 12.559 | 316 | 1559006 |
|   |   |   | 20.00 | 144 | 7185.6 | 147451.0 | 20.520 | 196 | 1885182 |
| A | F3CCOOH | 952 | SOLID | 0 | 6416.8 | 12226.9 | 1.905 | 307 | 74846 |
|   |   |   | 20.00 | 13 | 6413.2 | 13342.4 | 2.080 | 312 | 123462 |
|   |   |   | 20.00 | 32 | 5353.8 | 13369.8 | 2.497 | 184 | 123462 |
|   |   |   | 20.00 | 46 | 6297.3 | 13809.4 | 2.193 | 195 | 118565 |
|   |   |   | 20.00 | 60 | 7423.6 | 27213.0 | 3.666 | 260 | 313298 |
|   |   |   | 20.00 | 73 | 6827.9 | 16564.8 | 2.426 | 256 | 143114 |
|   |   |   | 20.00 | 95 | 7667.2 | 21304.8 | 2.779 | 256 | 190654 |
|   |   |   | 20.00 | 110 | 6259.6 | 25208.1 | 4.027 | 252 | 272844 |

TABLE 1-continued

Acid Stabilization of Hydrogensilsesquioxane Solutions in Methyl Isobutyl Ketone @ 25 C.

| RESIN LOT # | ACID TYPE | ACID CONC (ppm) | PERCENT SOLIDS (%) | ELAPSED TIME (days) | Mn | Mw | Mw/Mn | Low Mw | High Mw |
|---|---|---|---|---|---|---|---|---|---|
| | | | 20.00 | 123 | 7524.6 | 30964.2 | 4.115 | 316 | 405023 |
| | | | 20.00 | 131 | 6833.4 | 34145.9 | 4.997 | 316 | 405023 |
| | | | 20.00 | 144 | 5846.6 | 43496.1 | 7.440 | 196 | 632454 |
| A | H3BO3 | 269 | SOLID | 0 | 6416.8 | 12226.9 | 1.905 | 307 | 74848 |
| | | | 20.00 | 13 | 6599.4 | 13342.4 | 2.022 | 299 | 99051 |
| | | | 20.00 | 32 | 5739.0 | 13882.7 | 2.419 | 179 | 103918 |
| | | | 20.00 | 46 | 6442.9 | 14341.0 | 2.226 | 188 | 143114 |
| | | | 20.00 | 60 | 6817.1 | 15360.0 | 2.263 | 260 | 148043 |
| | | | 20.00 | 73 | 6218.2 | 15911.5 | 2.559 | 256 | 148043 |
| | | | 20.00 | 95 | 6124.8 | 18039.6 | 2.945 | 256 | 172770 |
| | | | 20.00 | 110 | 6626.4 | 19573.2 | 2.954 | 252 | 192645 |
| | | | 20.00 | 123 | 6953.1 | 21341.9 | 3.069 | 325 | 222598 |
| | | | 20.00 | 131 | 6558.9 | 22288.1 | 3.398 | 316 | 212596 |
| | | | 20.00 | 144 | 5124.7 | 23728.2 | 4.630 | 179 | 217595 |
| A | H3BO3 | 914 | SOLID | 0 | 6416.8 | 12226.9 | 1.905 | 307 | 74846 |
| | | | 20.00 | 13 | 6752.3 | 13150.2 | 1.947 | 307 | 94193 |
| | | | 20.00 | 32 | 6125.7 | 13177.6 | 2.151 | 201 | 94678 |
| | | | 20.00 | 46 | 4752.9 | 11797.9 | 2.482 | 188 | 99051 |
| | | | 20.00 | 60 | 6362.9 | 13846.1 | 2.176 | 256 | 133275 |
| | | | 20.00 | 73 | 6217.3 | 14194.3 | 2.283 | 256 | 133275 |
| | | | 20.00 | 95 | 5523.9 | 15148.7 | 2.742 | 256 | 143114 |
| | | | 20.00 | 110 | 5587.5 | 16187.4 | 2.897 | 252 | 164843 |
| | | | 20.00 | 123 | 6255.7 | 17163.5 | 2.700 | 325 | 167814 |
| | | | 20.00 | 131 | 6163.5 | 18233.4 | 2.958 | 316 | 157917 |
| | | | 20.00 | 144 | 4733.3 | 19471.4 | 4.114 | 196 | 172770 |
| A | p-TSA | 183 | SOLID | 0 | 6416.8 | 12226.9 | 1.905 | 307 | 74846 |
| | | | 20.00 | 13 | 6682.1 | 12866.6 | 1.926 | 307 | 92251 |
| | | | 20.00 | 32 | 5594.7 | 12336.5 | 2.205 | 184 | 85468 |
| | | | 20.00 | 46 | 5528.4 | 11387.5 | 2.060 | 188 | 93222 |
| | | | 20.00 | 60 | 5337.6 | 12035.2 | 2.255 | 256 | 94678 |
| | | | 20.00 | 73 | 4844.9 | 11907.4 | 2.458 | 256 | 94241 |
| | | | 20.00 | 95 | 4560.2 | 11843.5 | 2.597 | 256 | 93222 |
| | | | 20.00 | 110 | 4461.2 | 11807.0 | 2.647 | 252 | 94193 |
| | | | 20.00 | 123 | 4761.9 | 11807.0 | 2.479 | 325 | 89342 |
| | | | 20.00 | 131 | 3880.6 | 12190.4 | 3.141 | 188 | 94193 |
| | | | 20.00 | 144 | 3826.4 | 12446.1 | 3.253 | 196 | 94678 |
| A | p-TSA | 990 | SOLID | 0 | 6416.8 | 12226.9 | 1.905 | 307 | 74846 |
| | | | 20.00 | 13 | 6428.5 | 12756.9 | 1.984 | 307 | 94193 |
| | | | 20.00 | 32 | 4493.3 | 12035.2 | 2.678 | 201 | 94193 |
| | | | 20.00 | 46 | 4521.8 | 11423.9 | 2.526 | 201 | 84501 |
| | | | 20.00 | 60 | 4992.4 | 12638.0 | 2.531 | 256 | 94678 |
| | | | 20.00 | 73 | 4636.0 | 13067.8 | 2.819 | 256 | 133275 |
| | | | 20.00 | 95 | 4489.7 | 14680.5 | 3.270 | 256 | 138192 |
| | | | 20.00 | 110 | 4275.8 | 15102.8 | 3.532 | 248 | 157917 |
| | | | 20.00 | 123 | 4561.9 | 16242.7 | 3.560 | 320 | 172770 |
| | | | 20.00 | 131 | 4388.9 | 19785.9 | 4.508 | 188 | 192645 |
| | | | 20.00 | 144 | 4009.6 | 21518.0 | 5.367 | 196 | 282937 |
| A | ACETIC | 192 | SOLID | 0 | 6416.8 | 12226.9 | 1.905 | 307 | 74846 |
| | | | 20.00 | 13 | 7468.7 | 24779.7 | 3.318 | 312 | 293044 |
| | | | 20.00 | 32 | 6617.4 | 52261.6 | 7.898 | 192 | 863313 |
| | | | 20.00 | 46 | 9033.1 | 77690.2 | 8.601 | 222 | 1289426 |
| | | | 20.00 | 60 | 9314.1 | 103139.2 | 11.073 | 256 | 1559006 |
| | | | 20.00 | 73 | 9804.2 | 130034.0 | 13.263 | 256 | 1559006 |
| | | | 20.00 | 110 | 9087.5 | 180114.5 | 19.820 | 248 | 2104051 |
| | | | 20.00 | 123 | 10440.4 | 194836.5 | 18.662 | 329 | 2213872 |
| | | | 20.00 | 131 | 8869.1 | 174456.5 | 19.670 | 320 | 1939799 |
| | | | 20.00 | 144 | 6448.3 | 183393.7 | 28.441 | 184 | 1776158 |
| A | ACETIC | 1019 | SOLID | 0 | 6416.8 | 12226.9 | 1.905 | 307 | 74846 |
| | | | 20.00 | 13 | 7758.4 | 31685.1 | 4.084 | 299 | 394788 |
| | | | 20.00 | 32 | 7387.5 | 104015.9 | 14.080 | 171 | 1450911 |
| | | | 20.00 | 46 | 9786.1 | 172076.0 | 17.584 | 184 | 1939799 |
| | | | 20.00 | 60 | 9740.7 | 211097.3 | 21.672 | 260 | 2379056 |
| | | | 20.00 | 73 | 7280.2 | 180710.8 | 24.822 | 256 | 1994484 |
| | | | 20.00 | 94 | | SOLUTION GELLED | | | |
| B | NONE | 0 | SOLID | 0 | 4120.8 | 10804.4 | 2.622 | 282 | 67152 |
| | | | 20.00 | 9 | 4094.1 | 11269.0 | 2.752 | 282 | 75810 |
| | | | 20.00 | 28 | 4348.8 | 11715.8 | 2.694 | 269 | 80634 |
| | | | 20.00 | 42 | 4178.7 | 12007.8 | 2.874 | 265 | 84501 |
| | | | 20.00 | 56 | 3892.2 | 12236.0 | 3.144 | 256 | 99051 |
| | | | 20.00 | 69 | 3881.5 | 12857.5 | 3.312 | 256 | 94193 |
| | | | 20.00 | 91 | 4619.0 | 14331.9 | 3.103 | 256 | 108793 |
| | | | 20.00 | 105 | 4569.1 | 15332.4 | 3.356 | 256 | 143114 |
| | | | 20.00 | 119 | 4955.7 | 16343.9 | 3.296 | 325 | 157917 |
| | | | 20.00 | 127 | 4501.3 | 16666.1 | 3.703 | 258 | 152977 |

TABLE 1-continued

Acid Stabilization of Hydrogensilsesquioxane Solutions in Methyl Isobutyl Ketone @ 25 C.

| RESIN LOT # | ACID TYPE | ACID CONC (ppm) | PERCENT SOLIDS (%) | ELAPSED TIME (days) | Mn | Mw | Mw/Mn | Low Mw | High Mw |
|---|---|---|---|---|---|---|---|---|---|
| | | | 20.00 | 140 | 4076.3 | 16933.2 | 4.154 | 248 | 152977 |
| B | HNO3 | 170 | SOLID | 0 | 4120.8 | 10804.4 | 2.622 | 282 | 67152 |
| | | | 20.00 | 9 | 4218.8 | 11341.9 | 2.588 | 286 | 71958 |
| | | | 20.00 | 28 | 4127.1 | 11241.6 | 2.724 | 256 | 81117 |
| | | | 20.00 | 42 | 4062.1 | 11223.4 | 2.763 | 265 | 79669 |
| | | | 20.00 | 56 | 4006.9 | 11414.8 | 2.849 | 265 | 81600 |
| | | | 20.00 | 69 | 3589.3 | 11907.4 | 3.317 | 258 | 84501 |
| | | | 20.00 | 91 | 4479.0 | 12628.9 | 2.820 | 258 | 94193 |
| | | | 20.00 | 105 | 4477.2 | 13040.4 | 2.913 | 266 | 94678 |
| | | | 20.00 | 119 | 4571.8 | 13992.7 | 3.061 | 329 | 128365 |
| | | | 20.00 | 127 | 4347.1 | 13937.7 | 3.206 | 265 | 113676 |
| | | | 20.00 | 140 | 4120.8 | 13928.5 | 3.380 | 299 | 128365 |
| B | HNO3 | 458 | SOLID | 0 | 4120.8 | 10804.4 | 2.622 | 282 | 67152 |
| | | | 20.00 | 9 | 4255.3 | 11323.7 | 2.661 | 299 | 75810 |
| | | | 20.00 | 28 | 4206.3 | 11223.4 | 2.668 | 269 | 75810 |
| | | | 20.00 | 42 | 4186.7 | 11250.7 | 2.687 | 273 | 77738 |
| | | | 20.00 | 56 | 4033.6 | 10913.7 | 2.706 | 265 | 75810 |
| | | | 20.00 | 69 | 3745.6 | 11305.4 | 3.018 | 256 | 76774 |
| | | | 20.00 | 91 | 4315.9 | 11341.9 | 2.628 | 260 | 75810 |
| | | | 20.00 | 105 | 4305.2 | 11232.5 | 2.609 | 258 | 79669 |
| | | | 20.00 | 119 | 4517.3 | 11524.2 | 2.551 | 329 | 94193 |
| | | | 20.00 | 127 | 4039.8 | 11469.5 | 2.839 | 260 | 81600 |
| | | | 20.00 | 140 | 3841.5 | 11086.7 | 2.886 | 273 | 74846 |
| B | BENZOIC | 100 | SOLID | 0 | 4120.8 | 10804.4 | 2.622 | 282 | 67152 |
| | | | 20.00 | 9 | 4096.8 | 11177.8 | 2.728 | 286 | 78703 |
| | | | 20.00 | 28 | 4493.3 | 11962.1 | 2.662 | 265 | 80634 |
| | | | 20.00 | 42 | 4148.4 | 12117.3 | 2.921 | 256 | 86436 |
| | | | 20.00 | 56 | 4226.8 | 12683.8 | 3.001 | 269 | 99051 |
| | | | 20.00 | 69 | 4054.1 | 13232.5 | 3.264 | 258 | 99051 |
| | | | 20.00 | 91 | 4666.3 | 14781.4 | 3.168 | 258 | 123462 |
| | | | 20.00 | 105 | 4663.7 | 15433.5 | 3.309 | 258 | 143114 |
| | | | 20.00 | 119 | 4995.9 | 16822.6 | 3.367 | 325 | 157917 |
| | | | 20.00 | 127 | 4763.6 | 17615.2 | 3.698 | 273 | 162863 |
| | | | 20.00 | 140 | 4661.9 | 18214.9 | 3.907 | 269 | 162863 |
| B | BENZOIC | 490 | SOLID | 0 | 4120.8 | 10804.4 | 2.622 | 282 | 67152 |
| | | | 20.00 | 9 | 4251.7 | 11378.3 | 2.676 | 290 | 75810 |
| | | | 20.00 | 28 | 3964.2 | 11825.2 | 2.983 | 273 | 89342 |
| | | | 20.00 | 42 | 3971.3 | 11524.2 | 2.902 | 265 | 77738 |
| | | | 20.00 | 56 | 4191.2 | 12766.0 | 3.046 | 256 | 99051 |
| | | | 20.00 | 69 | 4432.6 | 13552.9 | 3.058 | 256 | 94241 |
| | | | 20.00 | 91 | 4621.7 | 14653.0 | 3.170 | 256 | 138192 |
| | | | 20.00 | 105 | 4683.3 | 15516.2 | 3.313 | 256 | 143114 |
| | | | 20.00 | 119 | 5122.0 | 16702.9 | 3.261 | 325 | 140160 |
| | | | 20.00 | 127 | 4586.9 | 17200.4 | 3.750 | 269 | 148043 |
| | | | 20.00 | 140 | 4446.9 | 17827.4 | 4.009 | 273 | 157917 |
| B | H3PO4 | 170 | SOLID | 0 | 4120.8 | 10804.4 | 2.622 | 282 | 67152 |
| | | | 20.00 | 9 | 5555.3 | 16868.7 | 3.037 | 290 | 2104051 |
| | | | 20.00 | 13 | SOLUTION GELLED | | | | |
| B | H3PO4 | 560 | SOLID | 0 | 4120.8 | 10804.4 | 2.622 | 282 | 67162 |
| | | | 20.00 | 9 | 4283.8 | 11360.1 | 2.652 | 290 | 74846 |
| | | | 20.00 | 28 | 4145.8 | 11159.6 | 2.692 | 273 | 79669 |
| | | | 20.00 | 42 | 4150.2 | 11341.9 | 2.733 | 269 | 80634 |
| | | | 20.00 | 56 | 4001.6 | 11450.4 | 2.864 | 273 | 92251 |
| | | | 20.00 | 69 | 3822.0 | 11925.6 | 3.120 | 256 | 89342 |
| | | | 20.00 | 91 | 4499.5 | 12409.6 | 2.758 | 260 | 93222 |
| | | | 20.00 | 105 | 4408.5 | 13012.9 | 2.952 | 256 | 94193 |
| | | | 20.00 | 119 | 4694.0 | 13800.2 | 2.940 | 329 | 113676 |
| | | | 20.00 | 127 | 4411.2 | 14148.5 | 3.207 | 265 | 118565 |
| | | | 20.00 | 140 | 4339.0 | 15176.2 | 3.498 | 269 | 143114 |
| B | F3CCOOH | 138 | SOLID | 0 | 4120.8 | 10804.4 | 2.622 | 282 | 67152 |
| | | | 20.00 | 9 | 4342.6 | 11542.5 | 2.658 | 299 | 76774 |
| | | | 20.00 | 28 | 4195.6 | 11734.0 | 2.797 | 269 | 81600 |
| | | | 20.00 | 42 | 4158.2 | 12117.3 | 2.914 | 265 | 89342 |
| | | | 20.00 | 56 | 4128.2 | 12656.3 | 3.066 | 260 | 99051 |
| | | | 20.00 | 69 | 4223.2 | 13580.4 | 3.216 | 256 | 94678 |
| | | | 20.00 | 91 | 4951.2 | 15213.0 | 3.073 | 273 | 143114 |
| | | | 20.00 | 105 | 4802.9 | 15123.0 | 3.357 | 256 | 152977 |
| | | | 20.00 | 119 | 5185.5 | 17569.1 | 3.388 | 329 | 167814 |
| | | | 20.00 | 127 | 4710.1 | 17762.8 | 3.771 | 269 | 148043 |
| | | | 20.00 | 140 | 4659.2 | 18759.7 | 4.026 | 273 | 172770 |
| B | F3CCOOH | 488 | SOLID | 0 | 4120.8 | 10804.4 | 2.622 | 282 | 67152 |
| | | | 20.00 | 9 | 4194.7 | 11378.3 | 2.713 | 290 | 76774 |
| | | | 20.00 | 28 | 4092.4 | 11442.2 | 2.796 | 265 | 75810 |
| | | | 20.00 | 42 | 4089.7 | 11697.5 | 2.860 | 265 | 80634 |

TABLE 1-continued

Acid Stabilization of Hydrogensilsesquioxane Solutions in Methyl Isobutyl Ketone @ 25 C.

| RESIN LOT # | ACID TYPE | ACID CONC (ppm) | PERCENT SOLIDS (%) | ELAPSED TIME (days) | Mn | Mw | Mw/Mn | Low Mw | High Mw |
|---|---|---|---|---|---|---|---|---|---|
| | | | 20.00 | 56 | 3938.4 | 11962.1 | 3.037 | 260 | 90312 |
| | | | 20.00 | 69 | 3918.0 | 12665.5 | 3.233 | 258 | 93222 |
| | | | 20.00 | 91 | 4705.6 | 14524.5 | 3.087 | 258 | 118565 |
| | | | 20.00 | 105 | 4823.5 | 15773.6 | 3.270 | 256 | 152977 |
| | | | 20.00 | 119 | 5131.8 | 16905.5 | 3.294 | 329 | 152977 |
| | | | 20.00 | 127 | 4646.7 | 17421.6 | 3.749 | 290 | 157917 |
| | | | 20.00 | 140 | 4505.7 | 18298.0 | 4.061 | 265 | 167814 |
| B | H3BO3 | 110 | SOLID | 0 | 4120.8 | 10804.4 | 2.622 | 282 | 67152 |
| | | | 20.00 | 9 | 4173.4 | 11086.7 | 2.657 | 290 | 74846 |
| | | | 20.00 | 28 | 4023.8 | 11405.7 | 2.835 | 265 | 77738 |
| | | | 20.00 | 42 | 4340.8 | 11697.5 | 2.695 | 265 | 84501 |
| | | | 20.00 | 56 | 4280.2 | 12053.4 | 2.816 | 269 | 92251 |
| | | | 20.00 | 69 | 3823.8 | 12446.1 | 3.255 | 256 | 92251 |
| | | | 20.00 | 91 | 4661.9 | 13360.7 | 2.888 | 260 | 94193 |
| | | | 20.00 | 105 | 4510.2 | 13763.6 | 3.052 | 258 | 108793 |
| | | | 20.00 | 119 | 4966.4 | 14827.3 | 2.986 | 325 | 133275 |
| | | | 20.00 | 127 | 4438.9 | 14854.9 | 3.347 | 299 | 118565 |
| | | | 20.00 | 140 | 4414.8 | 15755.2 | 3.569 | 265 | 143114 |
| B | H3BO3 | 445 | SOLID | 0 | 4120.8 | 10804.4 | 2.622 | 282 | 67152 |
| | | | 20.00 | 6 | | SOLUTION GELLED | | | |
| B | p-TSA | 180 | SOLID | 0 | 4120.8 | 10804.4 | 2.622 | 282 | 67152 |
| | | | 20.00 | 9 | 4252.6 | 11295.3 | 2.656 | 295 | 74846 |
| | | | 20.00 | 28 | 4216.1 | 10959.2 | 2.599 | 273 | 69553 |
| | | | 20.00 | 42 | 3987.4 | 10804.4 | 2.710 | 265 | 74846 |
| | | | 20.00 | 56 | 3750.9 | 10522.3 | 2.805 | 260 | 70034 |
| | | | 20.00 | 69 | 3740.2 | 11013.9 | 2.945 | 256 | 74846 |
| | | | 20.00 | 91 | 4283.8 | 10677.3 | 2.539 | 260 | 74846 |
| | | | 20.00 | 105 | 4309.6 | 10804.4 | 2.507 | 278 | 80634 |
| | | | 20.00 | 119 | 4368.4 | 10895.5 | 2.494 | 325 | 74846 |
| | | | 20.00 | 127 | 3950.9 | 11032.1 | 2.792 | 248 | 80634 |
| | | | 20.00 | 140 | 3691.4 | 10576.9 | 2.865 | 265 | 72920 |
| B | p-TSA | 550 | SOLID | 0 | 4120.8 | 10804.4 | 2.622 | 282 | 67152 |
| | | | 20.00 | 9 | 4192.1 | 11187.0 | 2.669 | 286 | 74846 |
| | | | 20.00 | 28 | 3926.0 | 10904.6 | 2.778 | 269 | 84501 |
| | | | 20.00 | 42 | 3740.2 | 10631.5 | 2.842 | 265 | 74846 |
| | | | 20.00 | 56 | 3437.6 | 10304.0 | 2.997 | 260 | 72882 |
| | | | 20.00 | 69 | 3454.4 | 11004.8 | 3.186 | 256 | 84501 |
| | | | 20.00 | 91 | 4208.1 | 11241.6 | 2.671 | 260 | 78703 |
| | | | 20.00 | 105 | 3966.9 | 11004.8 | 2.774 | 260 | 77738 |
| | | | 20.00 | 119 | 4139.5 | 11542.5 | 2.788 | 329 | 94193 |
| | | | 20.00 | 127 | 3958.0 | 12391.3 | 3.131 | 256 | 94241 |
| | | | 20.00 | 140 | 3705.6 | 12281.7 | 3.314 | 269 | 92251 |
| B | ACETIC | 148 | SOLID | 0 | 4120.8 | 10804.4 | 2.622 | 282 | 67152 |
| | | | 20.00 | 9 | 4286.5 | 11332.8 | 2.644 | 286 | 74846 |
| | | | 20.00 | 28 | 4247.3 | 11852.6 | 2.791 | 265 | 84501 |
| | | | 20.00 | 42 | 4422.8 | 12327.4 | 2.787 | 265 | 89342 |
| | | | 20.00 | 56 | 4112.8 | 12574.1 | 3.057 | 260 | 99051 |
| | | | 20.00 | 69 | 4407.7 | 13552.9 | 3.075 | 256 | 103918 |
| | | | 20.00 | 91 | 4715.4 | 14726.4 | 3.123 | 260 | 128365 |
| | | | 20.00 | 105 | 4788.7 | 15746.0 | 3.288 | 256 | 133275 |
| | | | 20.00 | 119 | 4910.1 | 16684.5 | 3.398 | 325 | 143114 |
| | | | 20.00 | 140 | 4371.1 | 17587.6 | 4.024 | 252 | 152977 |
| B | ACETIC | 577 | SOLID | 0 | 4120.8 | 10804.4 | 2.622 | 282 | 67152 |
| | | | 20.00 | 9 | 4213.4 | 11323.7 | 2.688 | 295 | 74846 |
| | | | 20.00 | 28 | 4406.8 | 12099.1 | 2.745 | 282 | 91281 |
| | | | 20.00 | 42 | 4075.4 | 12144.7 | 2.980 | 265 | 87889 |
| | | | 20.00 | 56 | 4160.0 | 12811.7 | 3.080 | 260 | 94678 |
| | | | 20.00 | 69 | 3880.6 | 13736.1 | 3.540 | 256 | 103918 |
| | | | 20.00 | 91 | 4725.3 | 15295.7 | 3.237 | 256 | 128365 |
| | | | 20.00 | 105 | 4626.2 | 16150.6 | 3.491 | 256 | 143114 |
| | | | 20.00 | 119 | 5044.2 | 17467.7 | 3.463 | 325 | 152977 |
| | | | 20.00 | 127 | 4756.5 | 18261.1 | 3.839 | 260 | 143114 |
| | | | 20.00 | 140 | 4337.3 | 18556.5 | 4.278 | 248 | 167814 |

That which is claimed is:

1. A hydrogen silsesquioxane resin solution consisting essentially of:
   100 parts by weight solvent;
   0.1 to 100 parts by weight hydrogen silsesquioxane resin represented by the formula $(HSiO_{3/2})_n$ and containing 100 to 300 ppm silanol, wherein n is an even integer of 10 or more; and
   0.002 to 4 parts by weight acid.

2. The solution of claim 1 wherein at least 75% of the polymeric species of the resin have a molecular weight between about 1200 and about 50,000.

3. The solution of claim 1 wherein the solvent is selected from the group consisting of alcohols, aromatic hydrocarbons, alkanes, ketones, esters, glycol ethers, and cyclic dimethylpolysiloxanes.

4. The solution of claim 1 wherein the solvent is methylisobutylketone.

5. The solution of claim 1 wherein the acid is an inorganic acid.

6. The solution of claim 1 wherein the acid is selected from the group consisting of boric, carbonic, hydrochloric, iodic, nitric, nitrous, phosphoric, phosphorous, sulfuric and sulfurous.

7. The solution of claim 1 wherein the acid is nitric.

8. The solution of claim 1 wherein the acid is boric.

9. The solution of claim 1 wherein the acid is phosphoric.

10. The solution of claim 1 wherein the acid is phosphorous.

11. The solution of claim 1 wherein the acid is an organic acid.

12. The solution of claim 11 wherein the acid is selected from the group consisting of acetic, benzoic, butyric, citric, formic, lactic, maleic, naphthoic, oxalic,, phthalic, picric, propionic, succinic, tartaric, toluic, toluene sulfonic and trifluoroacetic.

13. The solution of claim 1 wherein the acid is included in an amount between about 0.01 and 0–1 parts by weight.

14. A hydrogen silsesquioxane resin solution consisting essentially of:

100 parts by weight solvent;

0.1 to 100 parts by weight hydrogen silsesquioxane resin represented by the formula $(HSiO_{3/2})_n$ and containing 100 to 300 ppm silanol wherein n is an even integer of 10 or more;

0.002 to 4 parts by weight acid: and modifying ceramic oxide precursors comprising a compound containing an element selected from the group consisting of titanium, zirconium, aluminum, tantalum, vanadium, niobium, boron and phosphorous wherein the compound contains at least one hydrolyzable substituent selected from the group consisting of alkoxy or acyloxy and the compound is present in an amount such that the coating contains 0.1 to 30 percent by weight modifying ceramic oxide.

15. A hydrogen silsesquioxane resin solution consisting essentially of:

100 parts by weight solvent;

0.1 to 100 parts by weight hydrogen silsesquioxane resin represented by the formula $(HSiO_{3/2})_n$ and containing 100 to 300 ppm silanol wherein n is an even integer of 10 or more;

0.002 to 4 parts by weight acid; and a platinum, rhodium or copper catalyst in an amount of between about 5 and about 500 ppm platinum, rhodium or copper based on the weight of hydrogen silsesquioxane resin.

* * * * *